(12) United States Patent
Hwangbo et al.

(10) Patent No.: US 12,351,121 B2
(45) Date of Patent: Jul. 8, 2025

(54) SEAT AIRBAG DEVICE FOR VEHICLE

(71) Applicant: HYUNDAI MOBIS CO., LTD., Seoul (KR)

(72) Inventors: Sang Won Hwangbo, Yongin-Si (KR); Choong Ryung Lee, Yongin-Si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/486,239

(22) Filed: Oct. 13, 2023

(65) Prior Publication Data

US 2024/0034265 A1    Feb. 1, 2024

Related U.S. Application Data

(63) Continuation of application No. 17/461,122, filed on Aug. 30, 2021, now Pat. No. 11,820,311.

(30) Foreign Application Priority Data

Sep. 4, 2020  (KR) .......................... 10-2020-0113324

(51) Int. Cl.
*B60R 21/207* (2006.01)
*B60R 21/231* (2011.01)
(Continued)

(52) U.S. Cl.
CPC .......... *B60R 21/207* (2013.01); *B60R 21/233* (2013.01); *B60R 21/2338* (2013.01);
(Continued)

(58) Field of Classification Search
CPC . B60R 21/207; B60R 21/233; B60R 21/2338; B60R 2021/23107;
(Continued)

(56) References Cited

U.S. PATENT DOCUMENTS

2006/0119082 A1    6/2006  Peng et al.
2014/0008898 A1*   1/2014  Tracht ..................... B60R 21/23
                                                 280/730.2
(Continued)

FOREIGN PATENT DOCUMENTS

DE    102020109466 A1 *  4/2021  .......... B60R 21/207
EP         3831673 A1      9/2021
(Continued)

OTHER PUBLICATIONS

Office Action issued Dec. 16, 2024 in corresponding Korean Patent Application No. 10-2020-0113324.

*Primary Examiner* — Karen Beck
(74) *Attorney, Agent, or Firm* — Novo TechIP International PLLC

(57) ABSTRACT

A seat airbag device for a vehicle is proposed. The seat airbag device for a vehicle includes: a main chamber located in a vehicle seat at a side portion of an occupant and configured to be deployed toward a front portion of the vehicle when gas is injected thereinto; a sub-chamber connected to a front end of the main chamber and configured to be deployed in a direction intersecting a deployment direction of the main chamber when the gas is injected thereinto; and an expansion portion expanded from the front end of the main chamber and connected to an upper portion or a lower portion of the sub-chamber.

8 Claims, 5 Drawing Sheets

(51) Int. Cl.
*B60R 21/233* (2006.01)
*B60R 21/2338* (2011.01)
*B60R 21/261* (2011.01)

(52) U.S. Cl.
CPC .. *B60R 21/261* (2013.01); *B60R 2021/23107* (2013.01); *B60R 2021/23386* (2013.01); *B60R 2021/2612* (2013.01)

(58) Field of Classification Search
CPC .. B60R 2021/23386; B60R 2021/2612; B60R 21/2346; B60R 2021/23146; B60R 2021/23308; B60R 21/23138; B60R 2021/2642
See application file for complete search history.

(56) References Cited

U.S. PATENT DOCUMENTS

| | | |
|---|---|---|
| 2015/0314748 A1 | 11/2015 | Mihm |
| 2017/0182962 A1 | 6/2017 | Hiraiwa et al. |
| 2017/0247006 A1 | 8/2017 | Rao et al. |
| 2019/0054890 A1 | 2/2019 | Kwon |
| 2020/0384941 A1 | 12/2020 | Kwon |
| 2021/0146874 A1 | 5/2021 | Lee et al. |
| 2021/0291778 A1 | 9/2021 | Kwon |
| 2021/0354654 A1 | 11/2021 | Lee et al. |
| 2022/0126777 A1 | 4/2022 | Fukawatase et al. |

FOREIGN PATENT DOCUMENTS

| | | |
|---|---|---|
| KR | 10-2014-0063022 A | 5/2014 |
| KR | 10-2020-0029022 A | 3/2020 |
| KR | 102144753 B1 | 8/2020 |
| KR | 20210065627 A | 6/2021 |

\* cited by examiner

SEAT AIRBAG DEVICE FOR VEHICLE

CROSS-REFERENCE TO RELATED APPLICATIONS

This application is a continuation of co-pending U.S. application Ser. No. 17/461,122 filed on Aug. 30, 2021, which claims the benefit of Korean Patent Application No. 10-2020-0113324, filed Sep. 4, 2020 the disclosure of which is herein incorporated by reference in their entirety.

BACKGROUND OF THE INVENTION

1. Field of the Invention

The present invention relates to a seat airbag device for a vehicle and, more particularly, to a seat airbag device configured to be deploy while surrounding an occupant during a vehicle collision.

2. Discussion of Related Art

Recently, with the development of autonomous vehicles, it is expected that an interior space of a vehicle will also undergo many changes. As autonomous driving becomes possible, a part that is expected to be most significantly changed in the interior space of a vehicle is a vehicle seat.

A traditional seat is capable of passive movements such as height adjustment or angle adjustment of the seatback in a fixed posture facing the front of the vehicle. However, as autonomous driving becomes possible, a driver is freed from driving, thereby allowing the seat to actively move to postures such as a rear-viewing posture or a side-viewing posture.

A seat airbag including a main chamber that can protect the side portion of an occupant and a sub-chamber that can protect the front portion of the occupant by being extended in a direction intersecting a deployment direction of the main chamber from a front end of the main chamber has been developed. Accordingly, the occupant can be effectively protected against a vehicle collision occurring in various directions However, when the main chamber and the sub-chamber are deployed, there is a problem in that the sub-chamber moves in a direction intersecting a deployment direction of the sub-chamber or in a direction opposite to the deployment direction of the sub-chamber due to an external impact.

The foregoing is intended merely to aid in the understanding of the background of the present invention and is not intended to mean that the present invention falls within the purview of the related art that is already known to those skilled in the art.

BRIEF SUMMARY OF THE INVENTION

Accordingly, the present invention has been made keeping in mind the above problems occurring in the related art, and the present invention is intended to provide a seat airbag device for a vehicle, the seat airbag device being configured such that, during a vehicle collision, a main chamber protects the side portion of an occupant, a sub-chamber deployed in a direction intersecting a deployment direction of the main chamber from a front end of the main chamber protects the front portion of the occupant, and an expansion portion expanded from the front end of the main chamber and connected to an upper end or a lower end of the sub-chamber prevents the sub-chamber from moving due to an external impact.

In order to achieve the above objective, according to one aspect of the present invention, there is provided a seat airbag device for a vehicle, the seat airbag device including: a main chamber located in a vehicle seat at a side portion of an occupant and configured to be deployed toward a front portion of the vehicle when gas is injected thereinto; a sub-chamber connected to a front end of the main chamber and configured to be deployed in a direction intersecting a deployment direction of the main chamber when the gas is injected thereinto; and an expansion portion expanded from the front end of the main chamber and connected to an upper portion or a lower portion of the sub-chamber.

The seat airbag device may include: a gas injector connected to a rear end of the main chamber and configured to inject the gas into the main chamber during operation thereof.

The expansion portion may be expanded from a lower portion of the front end of the main chamber toward the front portion of the vehicle to be connected to the lower portion of the sub-chamber.

The sub-chamber may include a first connection portion connected to the main chamber, and after the main chamber is deployed by the injected gas, the gas may be injected into the sub-chamber via the first connection portion to deploy the sub-chamber.

The expansion portion may include a second connection portion formed in a chamber shape into which the gas may be injected, and connected to the sub-chamber, and the gas injected into the main chamber may be injected into the sub-chamber via the first connection portion, and then, the gas injected into the sub-chamber may be injected into the expansion portion via the second connection portion.

The main chamber may include a diffuser, the diffuser being located in the main chamber and configured to guide a flow of the gas injected into the main chamber in a vertical direction.

The expansion portion may be expanded to have a planar shape extending from the main chamber to the sub-chamber.

The main chamber, the sub-chamber, and the expansion portion may be located at each side of the seat, and the main chambers, the sub-chambers, and the expansion portions may be symmetrically deployed.

The seat airbag device may include: a tether of which a first end may be connected to the seat and a second end be connected to the sub-chamber so as to support the sub-chamber when the sub-chamber is deployed.

The tether may include: an upper tether of which a first end may be connected to an upper portion of a seatback and a second end may be connected to an upper portion of the sub-chamber; and a lower tether of which a first end may be connected to a lower portion of the seatback or a seat cushion and a second end may be connected to the lower portion of the sub-chamber.

The tether may be formed in a plane tether extended in a planar direction and be coupled to the sub-chamber in a linear contact manner.

According to the present invention, the seat airbag device for a vehicle can protect the occupant in all directions during a vehicle collision by the main chamber and the sub-chamber that are deployed while surrounding the occupant during a vehicle collision.

Furthermore, the seat airbag device has the expansion portion expanded from the main chamber and connected to the sub-chamber. Accordingly, during deployment of the sub-chamber, moving of the sub-chamber in the direction intersecting the deployment direction thereof or in the direction opposite to the deployment direction thereof due to an external impact can be prevented.

BRIEF DESCRIPTION OF THE DRAWINGS

The above and other objectives, features, and other advantages of the present invention will be more clearly understood from the following detailed description when taken in conjunction with the accompanying drawings, in which.

DETAILED DESCRIPTION OF THE INVENTION

Figure 1:
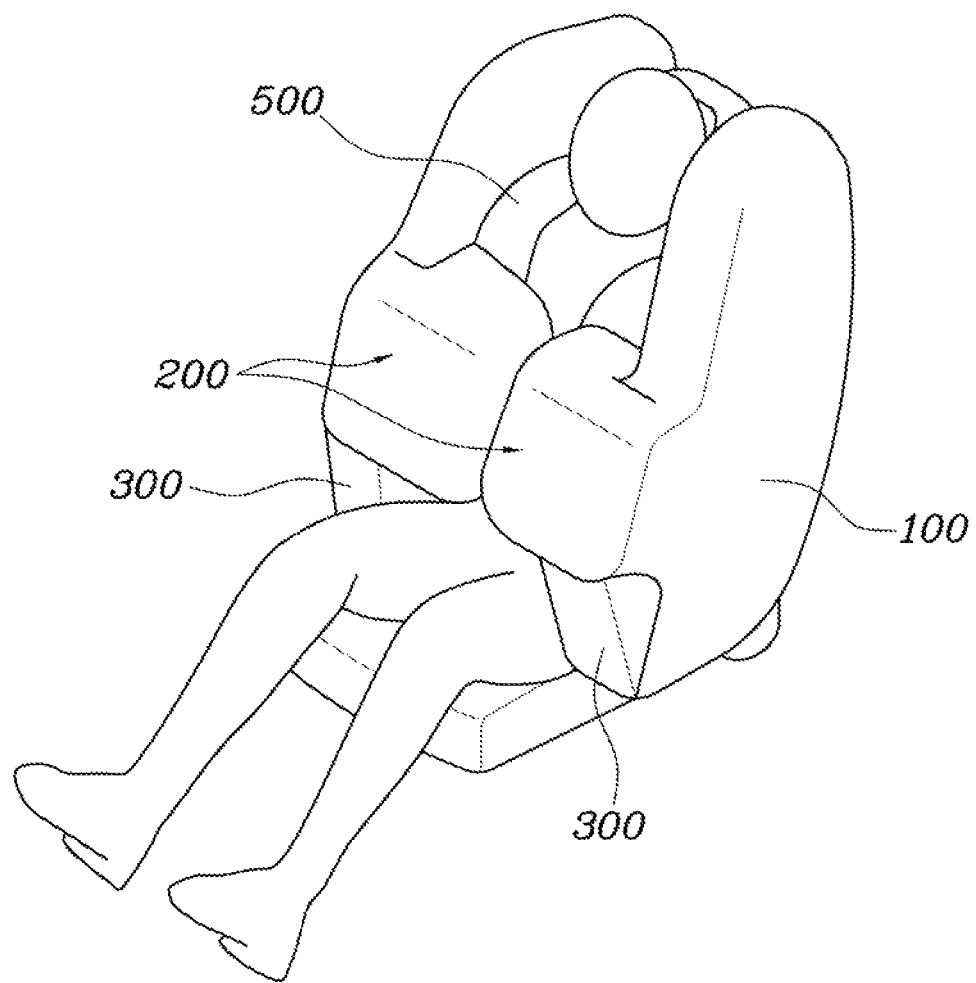
FIG. 1 is a perspective view showing a seat airbag device for a vehicle according to an embodiment of the present invention.

In the following description, the structural or functional description specified to exemplary embodiments according to the concept of the present invention is intended to describe the exemplary embodiments, so it should be understood that the present invention may be variously embodied, without being limited to the exemplary embodiments.

An embodiment described herein may be changed in various ways and various shapes, so specific embodiments are shown in the drawings and will be described in detail in this specification. However, it should be understood that the exemplary embodiment according to the concept of the present invention is not limited to the embodiment which will be described hereinbelow with reference to the accompanying drawings, but all of modifications, equivalents, and substitutions are included in the scope and spirit of the invention.

It will be understood that, although the terms first and/or second, etc. may be used herein to describe various elements, these elements should not be limited by these terms. These terms are only used to distinguish one element, from another element. For instance, a first element discussed below could be termed a second element without departing from the teachings of the present invention. Similarly, the second element could also be termed the first element.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween. Further, the terms used herein to describe a relationship between elements, that is, "between", "directly between", "adjacent", or "directly adjacent" should be interpreted in the same manner as those described above.

The terminology used herein is for the purpose of describing a particular embodiment only and is not intended to limit the present invention. Singular forms are intended to include plural forms unless the context clearly indicates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Unless otherwise defined, all terms including technical and scientific terms used herein have the same meaning as commonly understood by those skilled in the art to which the present invention belongs. It must be understood that the terms defined by the dictionary are identical with the meanings within the context of the related art, and they should not be ideally or excessively formally defined unless the context clearly dictates otherwise.

Hereinbelow, exemplary embodiments will be described hereafter in detail with reference to the accompanying drawings. Like reference numerals given in the drawings indicate like components.

Figure 2:
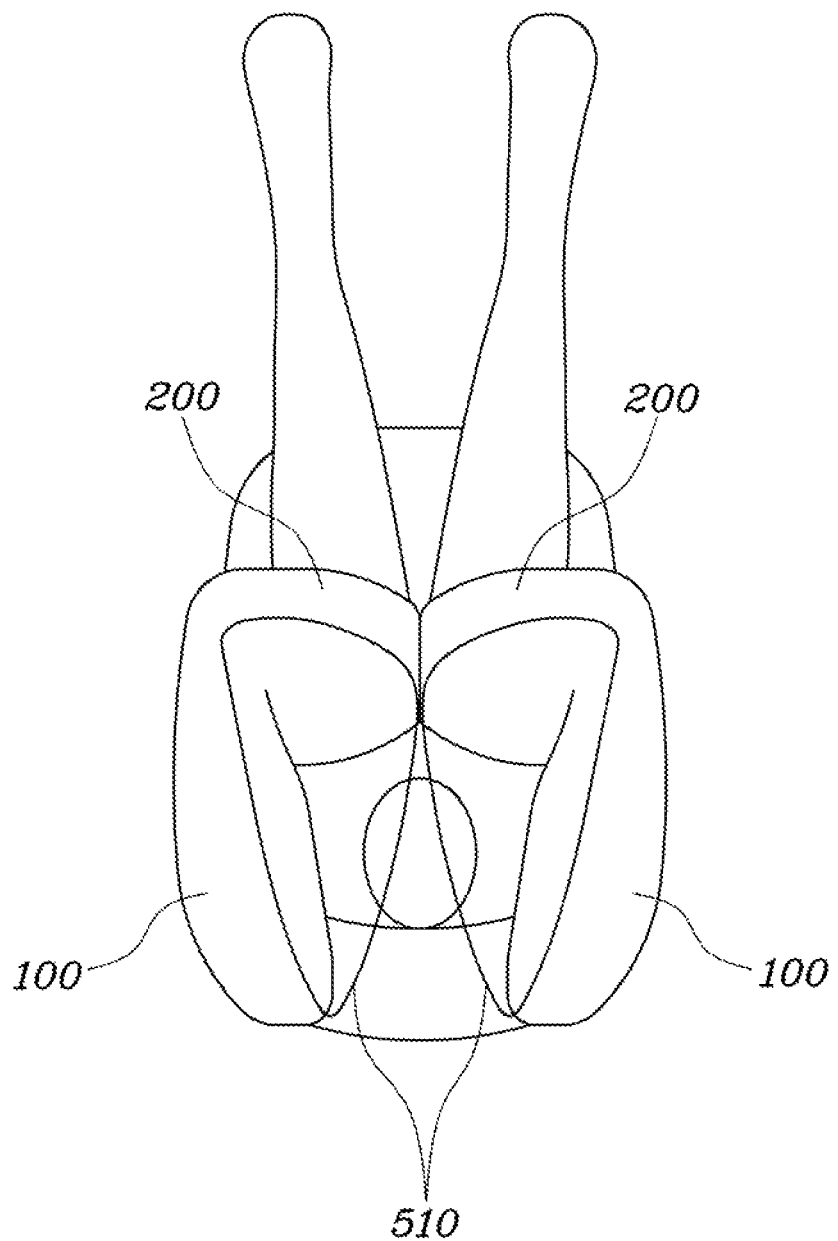
FIG. 2 is a plan view showing the seat airbag device for a vehicle according to the embodiment of the present invention.
Figure 3:
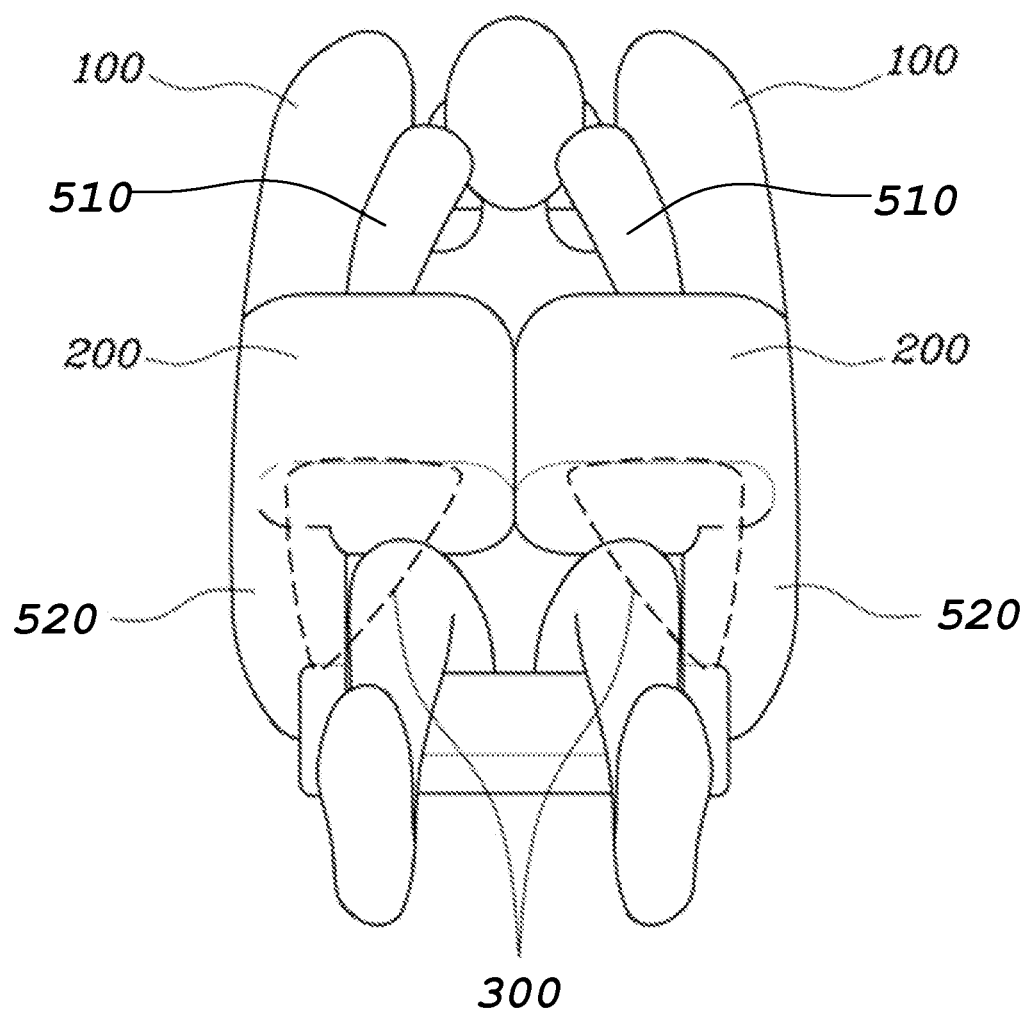
FIG. 3 is a front view showing the seat airbag device for a vehicle according to the embodiment of the present invention.

FIG. 1 is a perspective view showing a seat airbag device for a vehicle according to an embodiment of the present invention. FIG. 2 is a plan view showing the seat airbag device for a vehicle according to the embodiment of the present invention. FIG. 3 is a front view showing the seat airbag device for a vehicle according to the embodiment of the present invention.

Hereinbelow, the seat airbag device for a vehicle according to a preferred embodiment of the present invention will be described with reference to FIGS. 1 to 3.

The seat airbag device for a vehicle according to the present invention includes: a main chamber 100 located at an occupant-side portion of a vehicle seat and configured to be deployed to a front portion of the vehicle when gas is injected thereinto; a sub-chamber 200 connected to a front end of the main chamber 100 configured to be deployed in a direction intersecting a deployment direction of the main chamber 100 when the gas is injected thereinto; and an expansion portion 300 expanded from the front end of the main chamber 100 and connected to an upper portion or a lower portion of the sub-chamber 200.

As shown in FIGS. 1 to 3, the main chamber 100 is mounted to a side surface of a seatback, and may be deployed to the front portion of the vehicle during a vehicle accident to be located at a side surface of an occupant.

The sub-chamber 200 is connected to the front end of the main chamber 100, and is deployed in the direction intersecting with the deployment direction of the main chamber 100 and thus is located at a front surface of the occupant.

The expansion portion 300 may be expanded from the front end of the main chamber 100 and be connected to the upper portion or the lower portion of the sub-chamber 200.

Therefore, the main chamber 100 and the sub-chamber 200 may protect the occupant while surround the side surface and the front surface of the occupant during a vehicle collision.

In addition, as the expansion portion 300 is extended from the front end of the main chamber 100 and is connected to the sub-chamber 200, moving of the sub-chamber 200 in a direction opposite to a direction intersecting a deployment direction or in the deployment direction due to an external impact is prevented.

Figure 4:
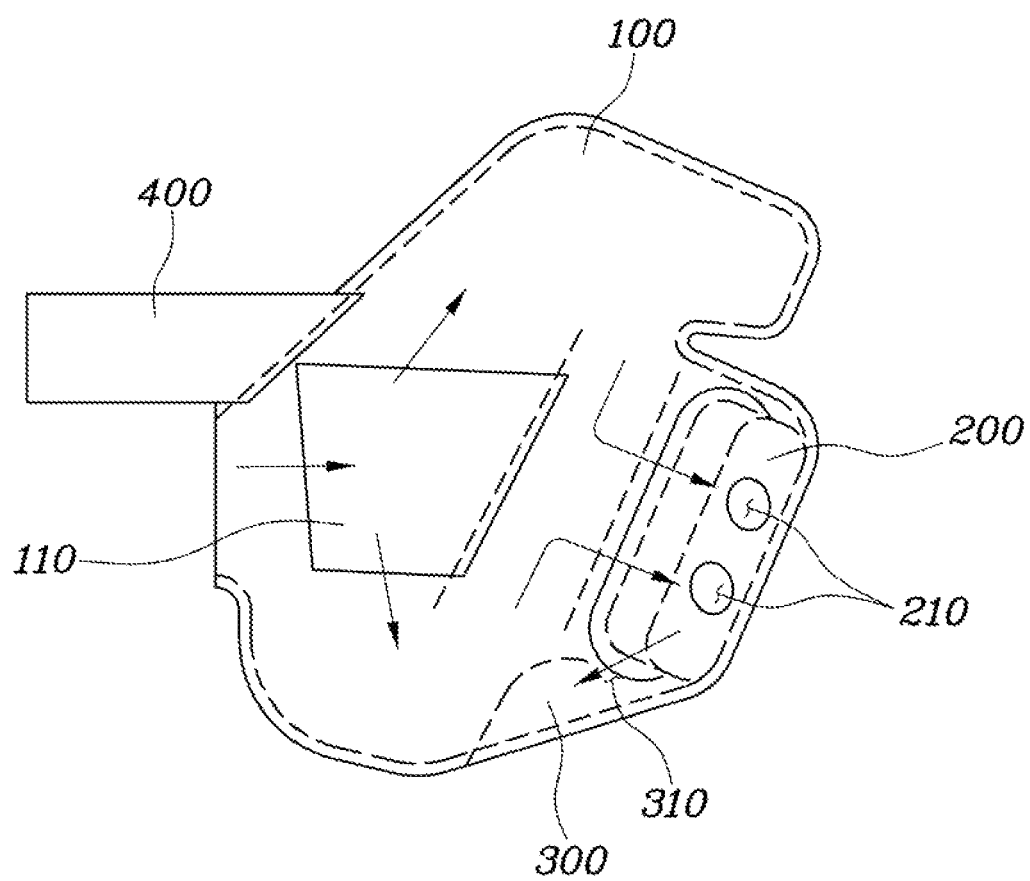
FIG. 4 is a side view showing a first embodiment of the seat airbag device for a vehicle according to the embodiment of the present invention.

FIG. 4 is a side view showing a first embodiment of the seat airbag device for a vehicle according to the embodiment of the present invention.

The seat airbag device includes a gas injector 400. The gas injector is connected to a rear end of the main chamber 100 and injecting the gas into the main chamber 100 during operation thereof.

The gas injector 400 is mounted to the seat and is connected to the rear end of the main chamber 100, and the gas injector 400 may inject the gas into the main chamber 100 during a vehicle collision so as to deploy the main chamber 100.

The expansion portion 300 may be expanded from a lower portion of the front end of the main chamber 100 to the front portion of the vehicle so as to be connected to the lower portion of the sub-chamber 200.

As the expansion portion 300 is expanded from the lower portion of the front end of the main chamber 100 to be connected to the lower portion of the sub-chamber 200, the expansion portion 300 may support the sub-chamber 200.

Therefore, as the expansion portion 300 is located at the lower portion of the front end of the main chamber 100, a side surface of the expansion portion 300 is supported by a console box of the vehicle or a vehicle door, so that moving of the sub-chamber 200 in the direction intersecting the deployment direction or a direction opposite to the deployment direction is prevented.

The sub-chamber 200 includes a first connection portion 210 connected to the main chamber 100, and after the main chamber 100 is deployed by the injected gas, the gas may be injected into the sub-chamber 200 via the first connection portion 210 to deploy the sub-chamber 200.

The sub-chamber 200 includes the first connection portion 210 at a portion thereof, which is connected to the main chamber 100 so as to communicate with the main chamber 100 so that the gas may flow between the sub-chamber 200 and the main chamber 100, and the gas injected into the main chamber 100 may be injected into the sub-chamber 200 by passing through the first connection portion 210.

Therefore, both the main chamber 100 and the sub-chamber 200 may be deployed by the single gas injector 400.

When the number or size of the first connection portion 210 is changed, a deployment speed of the sub-chamber 200 after deployment of the main chamber 100 may be changed.

The expansion portion 300 includes a second connection portion 310 formed in a chamber shape into which the gas is injected and connected to the sub-chamber 200. The gas injected into the main chamber 100 is injected into the sub-chamber 200 via the first connection portion 210, and then the gas injected into the sub-chamber 200 may be injected into the expansion portion 300 via the second connection portion 310.

Referring further to FIG. 4, the expansion portion 300 is expanded from the main chamber 100, but is formed in a separate chamber shape independently from the main chamber 100, and may be divided from the main chamber 100 by sewing. The expansion portion 300 includes the second connection portion 310 into which the gas is injected, at the portion connected to the sub-chamber 200, and the gas injected into the sub-chamber 200 may be injected into the expansion portion 300 via the second connection portion 310.

The gas may be injected into the main chamber 100, the sub-chamber 200, and the expansion portion 300 in order and the main chamber 100, the sub-chamber 200, and the expansion portion 300 may be deployed in order. As the expansion portion 300 is deployed after the sub-chamber 200 is deployed, moving of the sub-chamber 200 in the direction opposite to the deployment direction due to an external impact is prevented.

The main chamber 100 may include a diffuser 110. The diffuser 110 is located in the main chamber and guides and diffuses a flow the gas injected into the main chamber 100 in a vertical direction.

As shown in FIG. 4, the gas injector 400 is connected to the rear end of the main chamber 100, so that the gas may be injected into the rear end of the main chamber 100. The gas preferentially flows in an injected direction. However, in order to prevent such directional flow and to preferentially deploy the main chamber 100, the diffuser 110, which guides a flow of the gas injected from the rear end of the main chamber into the vertical direction of the main chamber 100, may be located in the main chamber 100.

Accordingly, after the main chamber 100 is fully deployed first, the sub-chamber 200 may be deployed.

Figure 5:
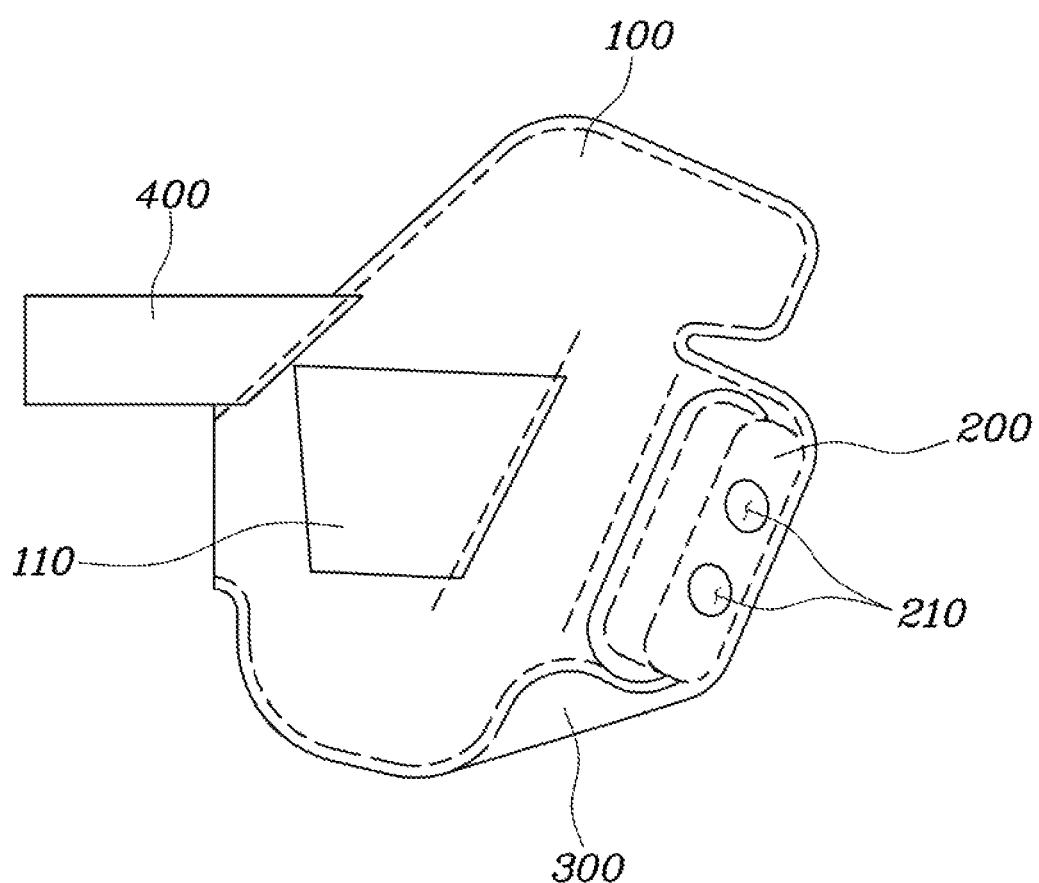
FIG. 5 is a side view showing a second embodiment of the seat airbag device for a vehicle according to the embodiment of the present invention.

FIG. 5 is a side view showing a second embodiment of the seat airbag device for a vehicle according to the embodiment of the present invention.

The expansion portion 300 is expanded to have a planar shape extending from the main chamber 100 to the sub-chamber 200.

Referring further to FIG. 5, as a second embodiment of the seat airbag device for a vehicle according to the present invention, the expansion portion 300 has a planar shaped selvage, and may be expanded from the first end of the main chamber 100 to the front portion of the vehicle so as to be connected to the sub-chamber 200.

The above structure may have the cost reduction effect compared to the first embodiment having the chamber-shaped expansion portion, and in addition, the planar expansion portion 300 supports the sub-chamber 200, so that moving of the sub-chamber 200 in the direction opposite to the deployment direction or in the deployment direction due to the external impact is prevented.

The main chamber 100, the sub-chamber 200, and the expansion portion 300 may be located each side of the seat, and the main chambers 100, the sub-chambers 200, and the expansion portions 300 may be symmetrically deployed.

The main chambers 100, the sub-chambers 200, and the expansion portions 300 are symmetrically mounted to both sides of the seatback, and may protect the side and front surfaces of the occupant during deployment thereof, and may prevent that the occupant is thrown out of the seat due to an external impact.

The seat airbag device includes: a tether 500 of which a first end is connected to the seat and a second end is connected to the sub-chamber 200 so as to support the sub-chamber 200 during deployment of the sub-chamber 200.

In order to prevent the sub-chamber 200 from moving in the direction intersecting the deployment direction or the direction opposite to the deployment direction due to an external impact during the deployment of the sub-chamber 200, the tether 500 may connect the seat to the sub-chamber 200.

Therefore, the sub-chamber 200 may be located at the front surface of the occupant, and the occupant is restrained by the sub-chamber 200 and the tether 500 thereby preventing a secondary collision between the occupant and an interior item in the vehicle.

The tether 500 includes: an upper tether 510 of which a first end is connected to an upper portion of the seatback and a second end is connected to the upper portion of the sub-chamber 200; and a lower tether 520 of which a first end is connected to a lower portion of the seatback or a seat cushion or a second end connected to the lower portion of the sub-chamber 200.

The upper tether 510 is provided such that the first end thereof is coupled the upper portion or an upper-side portion of the seatback and the second end thereof is coupled to the upper portion of the sub-chamber 200. Accordingly, the upper tether 510 may support the upper portion of the sub-chamber 200 and be deployed while surrounding the upper portion of the upper body of the occupant.

The lower tether 520 is provided such that the first end thereof is coupled to the lower portion of the seatback or the seat cushion and the second end thereof is coupled to the lower portion of the sub-chamber 200. Accordingly, the lower tether 520 may be deployed while surrounding the pelvis or the lower portion of the upper body of the occupant.

Therefore, the upper body of the occupant may be strongly restrained, and during a vehicle collision, there is an effect of preventing that the occupant is thrown out of the seat due to the collision.

The tether 500 may be formed in a plane tether extended in a planar direction and be coupled to the sub-chamber 200 in a linear contact manner.

The tether 500 is formed in the plane tether having a planar shape, and of which the first end is coupled to the seat and the second end is coupled to the sub-chamber 200 in a linear contact manner or a planar contact manner.

Therefore, as the tether 500 is formed in the plane tether, the support tether 500 may be coupled to the sub-chamber 200 while surrounding the occupant and thus improving restraint force to the occupant, and reducing the probability of uncoupling from the sub-chamber 200.

In addition, compared to the linear tether, the plane tether couples the seatback to the sub-chamber 200 while surrounding the occupant, so there is an effect of preventing the occupant from being injured due to the tether.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A seat airbag device stored in a side portion of a vehicle seat of a vehicle, the seat airbag device comprising:
    a main chamber configured to be deployed in a first direction toward a front portion of the vehicle to cover a side of an occupant seated at the vehicle seat when injected with gas;
    a sub-chamber connected to a front end portion of the main chamber, comprising a first connection portion connected to the main chamber, and configured to deploy in a second direction intersecting the first direction when the gas is injected from the main chamber via the first connection portion; and
    an expansion portion disposed between a lower portion of the front end portion of the main chamber and a lower portion of the sub-chamber, comprising a second connection portion connected to the sub-chamber, and configured to expand only when the gas is injected from the sub-chamber via the second connection portion such that the sub-chamber and the expansion portion are deployed in order.

2. The seat airbag device of claim 1, further comprising a gas injector connected to a rear end portion of the main chamber and configured to inject the gas into the main chamber during operation thereof.

3. The seat airbag device of claim 1, wherein the second connection portion is formed in a chamber shape.

4. The seat airbag device of claim 1, wherein the main chamber comprises a diffuser located in the main chamber and configured to guide a flow direction of the gas to allow the gas injected into the main chamber to diffuse in a vertical direction.

5. The seat airbag device of claim 1, wherein the main chamber, the sub-chamber, and the expansion portion are located at each side of the vehicle seat, and the main chambers, the sub-chambers and the expansion portions are symmetrically deployed.

6. The seat airbag device of claim 1, further comprising a support tether of which a first end is connected to the vehicle seat and a second end is connected to the sub-chamber so as to support the sub-chamber when the sub-chamber is deployed.

7. The seat airbag device of claim 6, wherein the support tether comprises:
    an upper tether having a first end connected to an upper portion of a seatback and a second end connected to an upper portion of the sub-chamber; and
    a lower tether having a first end connected to a lower portion of the seatback or a seat cushion and a second end connected to the lower portion of the sub-chamber.

8. The seat airbag device of claim 6, wherein the support tether is formed in a plane tether extending in a planar direction and is coupled to the sub-chamber in a linear contact manner.

* * * * *